(No Model.)
G. DEISEROTH.
COVERED PAN FOR CULINARY PURPOSES.
No. 586,705. Patented July 20, 1897.
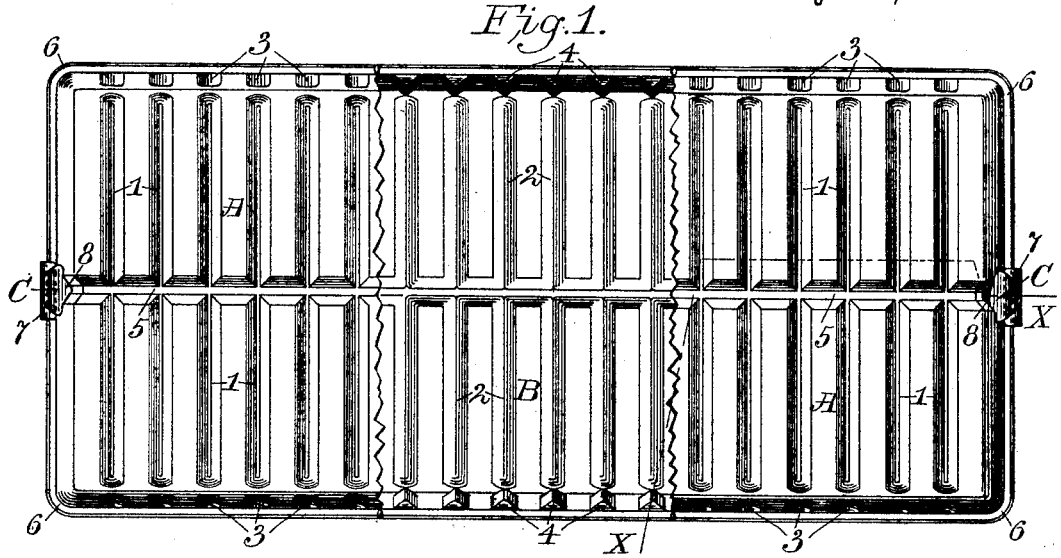
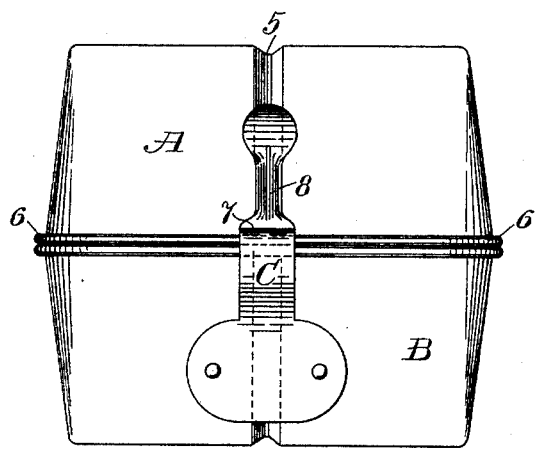
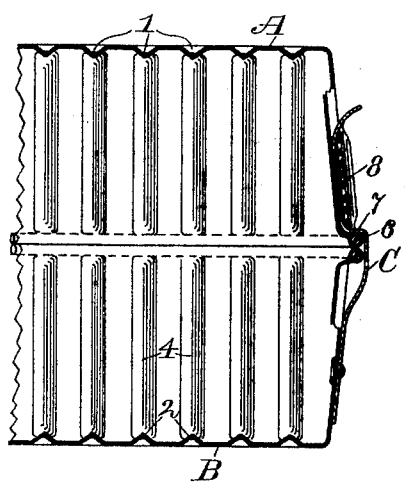
Witnesses:
J. W. Fisher
E. Luddeke
Inventor,
George Deiseroth,
by Wm. H. Low.
Attorney.

UNITED STATES PATENT OFFICE.

GEORGE DEISEROTH, OF ALBANY, NEW YORK.

COVERED PAN FOR CULINARY PURPOSES.

SPECIFICATION forming part of Letters Patent No. 586,705, dated July 20, 1897.

Application filed April 17, 1896. Serial No. 587,925. (No model.)

*To all whom it may concern:*

Be it known that I, GEORGE DEISEROTH, of Albany, in the county of Albany and State of New York, have invented new and useful Improvements in Covered Pans for Culinary Purposes, of which the following is a specification.

My invention relates to improvements in covered pans in which baking and other operations pertaining to cooking and similar processes can be effected; and it consists of a sheet-metal pan and cover, which are substantially counterparts, divided by indentations into corresponding spaces to indicate transverse lines of separation in the article formed therein and longitudinal indentations in top and bottom to indicate lines of longitudinal separation in the article formed therein, one part of said pan being provided with fastenings by which the two parts can be clamped together in corresponding position.

In the accompanying drawings, which are herein referred to and form part of this specification, Figure 1 is a plan view of my covered pan with a portion of the upper part or cover broken out to show the inner side of the lower part; Fig. 2, an end elevation of my covered pan, showing the two parts locked together; and Fig. 3, a longitudinal vertical section of part of my covered pan at the irregular line X X on Fig. 1.

As represented in the drawings, A designates the upper section or cover of my pan, which is made of sheet metal in the form of a rectangle with slightly-flaring sides and ends to facilitate the removal of an article formed therein. Said cover is usually formed by dies, and has transverse grooves 1 formed in the outer side of the top, whereby corresponding ridges 2 are produced on its inner side. In the flaring sides of said cover grooves 3 are formed in the outer side to produce ridges 4, which correspond in form and position to the ridges 2 at the top of the cover. In the top and each flaring end of the cover A a longitudinal groove 5 is formed to produce a corresponding ridge on the inner side of said cover. A flange 6 extends around the bottom edge of the flaring sides and ends of the cover A, for a purpose hereinafter explained.

B is the bottom section of the pan, and it is the exact counterpart of the cover A and is provided with grooves and ridges that correspond in every respect to those of the cover A. At each end of the bottom section B a spring-catch C is secured in position corresponding to the groove 5 of the cover B. Said spring-catch is made of resilient sheet metal, is secured to the bottom section, and is provided with a shoulder 7, that is adapted to engage over the flange 6 of the cover A in such manner that the sections A and B will be securely locked together. The spring-catch C has its upper arm formed to a V-shaped ridge, as at 8, and said ridge will take into the groove 5 at either end of the cover A, and thereby the parts A and B will be brought into exact correspondence.

When my pan is used for baking bread or other raised material, the bottom section B should be fully filled with the dough and the cover A secured thereon, after which the pan and its contents should be put aside to afford time for the dough to rise in the cover. Then by subjecting the pan and its contents to a suitable heat in an oven the dough will rise sufficiently to entirely fill the pan, both top and bottom sections. The moisture driven out of the dough in the process of baking will prevent the formation of a hard crust on the loaf, and the moisture will permeate through the loaf without rendering the same soggy and heavy.

By constructing my pan of sheet metal I am enabled to obtain an equal thickness of metal at all points, thereby insuring an equal effect of the heat in the process of baking, and, the upper and lower sections being exact counterparts, one die can be employed for stamping up the two parts. The transverse ridges being spaced at equal distances produce indentations in the loaf for cutting slices of uniform thickness, and the longitudinal ridges produce indentations in the loaf to indicate the proper place to separate the slices into equal parts for the purpose of cutting slices for sandwiches. The longitudinal grooves afford a suitable means for receiving a fastening device, whereby the two parts can be held sidewise in a true relation to each other.

The two parts of my pan can be used separately, for the purpose of baking cake, molding ice-cream or jellies, in which the ridges of the parts will form indentations to indicate the places for dividing the same into suitable pieces of uniform size.

What I claim as my invention, and desire to secure by Letters Patent, is—

A sheet-metal covered pan composed of two like parts, each having a series of transverse grooves and a longitudinal groove at its median line; one of said parts having fastening devices, substantially as described, adapted to take into the longitudinal groove of the other part and lock the two parts together, substantially as specified.

GEORGE DEISEROTH.

Witnesses:
WM. H. LOW,
LOUIS SCHWARTZ.